(No Model.)

A. B. JENKINS.
STEAM VALVE.

No. 273,284. Patented Mar. 6, 1883.

WITNESSES
Willard C. Fogg
Fred Haines

INVENTOR
Alfred B. Jenkins
by his attys
Clarke & Raymond

N. PETERS, Photo-Lithographer, Washington, D. C.

UNITED STATES PATENT OFFICE.

ALFRED B. JENKINS, OF NEW YORK, N. Y.

STEAM-VALVE.

SPECIFICATION forming part of Letters Patent No. 273,284, dated March 6, 1883.

Application filed September 25, 1882. (No model.)

*To all whom it may concern:*

Be it known that I, ALFRED B. JENKINS, of the city of New York, in the county of New York, and State of New York, a citizen of the United States, have invented a certain new and useful Improvement in Steam-Valves, of which the following is a full, clear, and exact description, reference being had to the accompanying drawings, forming a part of this specification, in explaining its nature, in which—

Figure 1:
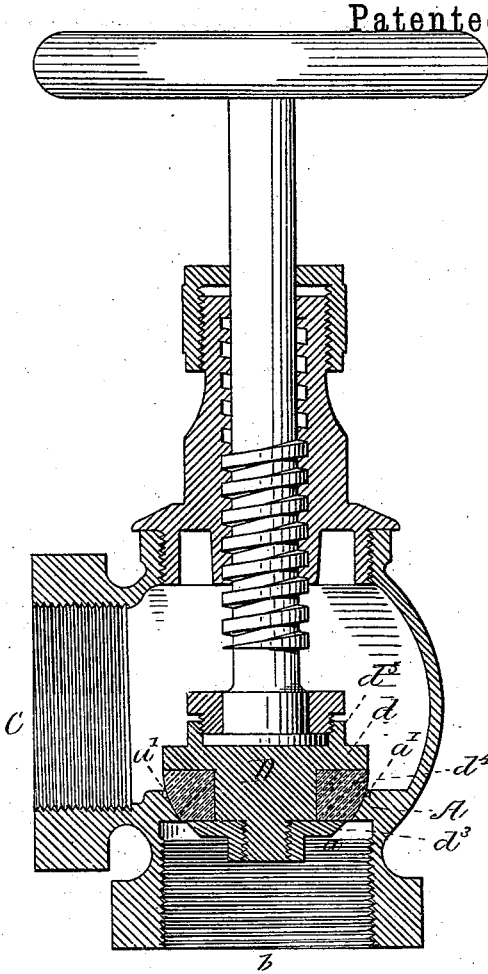
Figure 2:
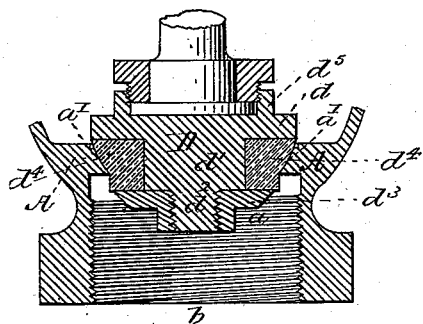
Figure 3:
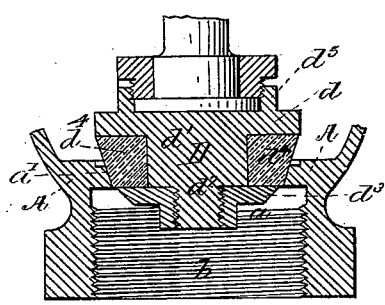

Figure 1 is a vertical section of a steam-valve containing my invention. Fig. 2 is a view in vertical section of the valve-head seat and a part of the casing, illustrating the operation of the valve. Fig. 3 is a view in section, illustrating a seat and packing of a slightly-different shape from that shown in Fig. 1.

This invention relates to the class of valves employing a molded disk of packing, such as the Jenkins patent packing.

It consists in an especial form of valve seat and packing, whereby provision is obtained for the gradual wear of the packing upon its edge from the lower part of the seat upward, thereby at all times insuring a perfect joint or seating of the valve.

Referring to the drawings, A represents the valve-diaphragm; $a$, the steamway through the diaphragm; $b$, the steam induction-way; $c$, the steam eduction-way.

$a'$ is the valve-seat, and it is formed by beveling or curving inwardly the upper edge of the diaphragm.

D is the valve-head. It comprises the disk $d$, the boss or projection $d'$, the screw-stem $d^2$, the nut $d^3$, and the ring or disk of packing $d^4$, which surrounds the boss $d'$, and is rounded or tapered upon its outer surface, as shown, and fastened in place by the nut $d^3$. This packing is thicker than the height of the valve-seat. The nut is made to enter the steamway in the diaphragm, and the lower surface of the packing is the portion which first bears upon the seat. As the valve is used, however, the lower section gradually wears away, and the seat portion of the valve-head gradually rises until the entire section within the dotted lines of Fig. 2 has been utilized.

It will be seen that the disk and the short screw-sleeve $d^5$, into which the stem coupling-nut screws, the boss $d'$, and the screw-stud $d^2$ are in one piece, and that the packing is exposed upon the entire side from nut to disk.

I am aware that the Patent No. 256,237 granted Matthew Mickelborough shows and describes a valve having a deep, depressed, straight-sided cavity or socket to receive and envelop the packing-disk, which is used in connection with a follower for compressing said packing laterally in said socket, and as my valve does not contain a seat of this description, and as my packing is not enveloped by the socket, but extends above it, and as the contact of the packing with the seat does not depend upon lateral compression caused by a plunger or follower, I consider that the said Mickelborough patent does not show or describe the features of my invention.

Having thus fully described my invention, I claim and desire to secure by Letters Patent of the United States—

1. The combination, in a valve, of the inclined seat $a'$ with the valve-head D, having the compressible packing $d^4$ of greater thickness than the width of the valve-seat, and of a shape to contact with the seat upon its outer surface or side, and to continue the side contact with the seat as it wears, all substantially as shown and described.

2. The combination of the valve-head D, having the disk $d$, boss $d'$, and screw-stud $d^2$, with the disk or ring of packing $d^4$, surrounding the boss, and of a thickness greater than the width of the valve-seat, and the nut $d^3$, all substantially as and for the purposes described.

ALFRED B. JENKINS.

Witnesses:
F. F. RAYMOND, 2d,
WILLARD C. FOGG.